Patented Apr. 21, 1931

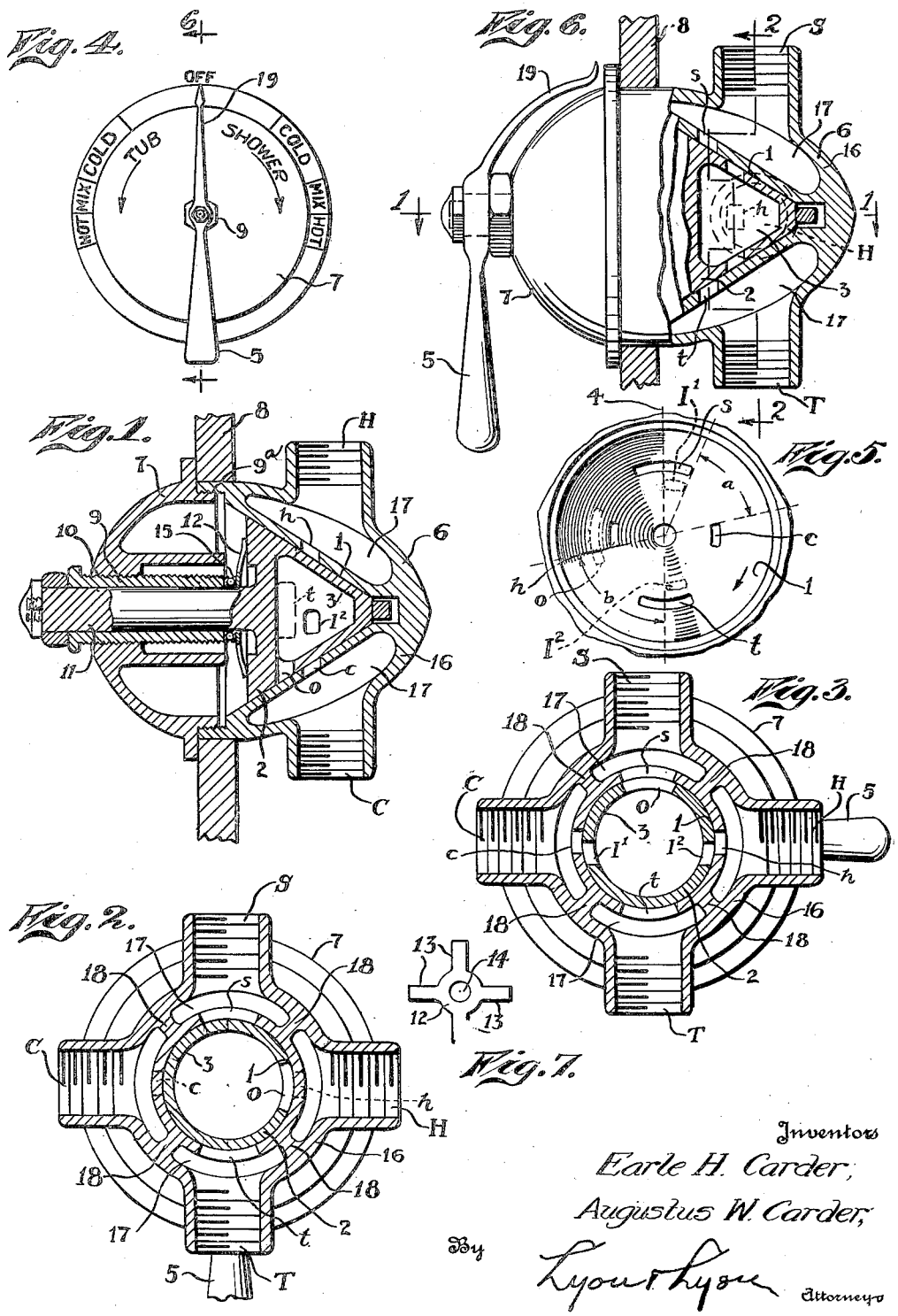

1,801,847

UNITED STATES PATENT OFFICE

EARLE H. CARDER AND AUGUSTUS W. CARDER, OF PACIFIC PALISADES, CALIFORNIA

COMBINATION HOT AND COLD WATER FAUCET

Application filed November 30, 1929. Serial No. 410,722.

This invention relates to valves, and particularly to valves of a type intended to control two liquids. While the valve may be used for many different purposes where the valve is intended to deliver either one of two liquids, or a graduated mixture of the same, the valve is expected to have its greatest usefulness as a combination hot and cold water valve, and particularly as a valve capable of serving a shower and a tub, enabling either hot or cold water, or any mixture thereof, to be delivered to either the tub or the shower.

The general object of the invention is to provide a simple valve for meeting such requirements, and one of the special objects of the invention is to provide a valve of this character having a single actuating handle which, when turned in one direction, will serve the tub and when turned in the other direction, will serve the shower, and operating, as the handle is turned in one direction or the other, to deliver first water of one extreme temperature and then a mixture of the hot and cold water, and thereafter, upon the further rotation, water of the other extreme temperature.

A further important object of the invention is to construct a valve in such a way that it will be substantially water-tight without offering great resistance to its rotation.

Further objects of the invention will appear hereinafter.

The invention consists in the novel parts and combination of parts to be described hereinafter, all of which contribute to produce an efficient combination hot and cold water faucet.

A preferred embodiment of the invention is described in the following specification, while the broad scope of the invention is pointed out in the appended claims.

In the drawings:

Figure 1 is a horizontal section through the valve, taken about on the line 1—1 of Fig. 6 and showing a portion of the supporting wall-plate in section and broken away.

Figure 2 is a vertical section taken about on the line 2—2 of Fig. 6 and looking toward the front of the valve. This view shows the valve in its "off" position.

Figure 3 is a view similar to Fig. 2 but showing the valve in a position to deliver a mixture of hot and cold water to the shower.

Figure 4 is a front elevation of the valve.

Figure 5 is a front elevation of the body of the valve with the bonnet of the valve removed so as to expose the valve-seat and illustrating in dotted lines the position of the ports of the valve when the valve is in its "off" position.

Figure 6 is a vertical section through the valve, taken about on the line 6—6 of Fig. 4.

Fig. 7 is a plan upon a reduced scale, illustrating a spring plate which we prefer to employ in the construction of the valve.

Referring more particularly to the parts, 1 represents a valve-seat which is preferably of conical form so as to receive a conical mixing valve 2 having a mixing chamber 3 therein. This conical valve has, of course, the same conical taper as the seat so as to make a nice machine fit with the seat.

In applying the invention to a valve of this type, we provide the seat 1 with two outlet ports indicated respectively by the letters $s$ and $t$ to the shower and the tub. These two ports are of arcuate form, that is to say, they are cut circumferentially in the wall of the seat and are at the same radius from the axis of rotation of the valve. In the case of a conical valve, as illustrated, these two outlet ports $s$ and $t$ will be in the same transverse plane, lying at right angles to the axis of rotation of the valve.

In addition to this, we provide the seat 1 with two other ports corresponding respectively to the two kinds of liquid that are to be controlled, for example, a port $h$, corresponding to the hot water, and a port $c$, corresponding to the cold water. These two ports $c$ and $h$ are also located at the same radius as regards each other but in a different plane of rotation with respect to the axis of the valve. These ports are located on a diametrical line or plane, (see Figure 5), which is transverse to the diametrical line that connects the ports $s$ and $t$. In other words, the ports $s$ and $t$ are preferably diametrically opposite to each other and the ports $c$ and $h$ are diametrically opposite to each other but located in a medial plane between the ports *s* and *t*.

The conical valve is not illustrated in Figure 5 but in this view we illustrate the ports that are provided in the conical valve, the same being illustrated by dotted lines. This valve carries an outlet port O which is at the same radius and plane of rotaton as the ports *s* and *t* and when the valve is in its "off" position this port is located midway between the ports *s* and *t*. (See Fig. 5.) In addition to this, the valve is provided with two inlet ports $I^1$ and $I^2$ which are located on the same radius and plane of rotation as the ports *c* and *h*. These two ports $I^1$ and $I^2$ are located opposite to each other and in intermediate positions between the ports *c* and *h* but are nearer to one of these ports than the other. For example, in Figure 5 they are represented as located nearer to the port *h* than the valve *c*. As illustrated, they are located on the same side of a vertical plane indicated by the line 4 passing downwardly through the valve. The valve may be rotated in either direction by means of a suitable handle 5. With the organization of ports as illustrated in Figure 5, it will be evident that if the handle 5 is swung to the left, as viewed from the front, the outlet port O will move up and register with the port *s*. At the same time, the port $I^1$ of the valve will move down and eventually communicate with the port *c*. By reason of the fact that the angle *a*, as indicated in Figure 5, is smaller than the angle *b*, as indicated in Figure 5, the ports $I^1$ and *c* will communicate before the ports $I^2$ and *h* communicate, hence the first part of the effective movement of the valve will operate to admit cold water to the shower and if the rotation continues in the same direction the ports $I^2$ and *h* will communicate and give a mixture of hot and cold water to the shower. If the rotation is continued in the same direction the port $I^1$ will move out of register with the port *c* before the port $I^2$ will move out of register with the port *h* and consequently after a mixture of the two liquids has occurred the valve may deliver nothing but hot water to the shower.

If instead of rotating the handle in a direction to bring the port O into communication with the port *s*, the handle will be moved in the other direction, then the port O will come into communication with the port *t* and the valve will operate to admit, first, cold water into the tub and then a mixture of hot and cold water and thereafter only hot water.

It will be obvious that the direction of flow through the valve may be reversed if desired, and furthermore, where it is not necessary to provide for two outlets, such as is necessary to serve a shower and a tub, the valve, if desired, could be used with a single outlet for delivering two kinds of liquid through the same outlet with any desired mixture of the two liquids, depending upon the relative amount of opening of the said ports *h* and *c*.

In practice, the seat 1 of the valve is preferably constructed as an integral part of the valve body 6 and the body may be provided with a removable bonnet 7 which forms the front of the valve. The entire valve may be mounted in an opening in a wall-plate 8 so that the piping is carried within the wall. In this case the bonnet 7 may be connected to the body by a screw-thread connection $9^a$.

The valve 3 is preferably pressed lightly and resiliently onto the seat. In order to do this and provide for adjusting the yielding pressure, we prefer to provide the valve bonnet with an adjustable bushing 9 that has a thread-connection 10 with the bonnet on the axis of the stem 11 of the valve.

The bushing, at its inner end, receives the thrust of a spring 12 which thrusts against the outer face of the valve. In the present instance, we prefer to employ a spring of the spider form, illustrated in Figure 7. This spring 12 is in the form of a dished plate having a plurality of arms 13, the tips of which press against the outer face of the valve and the central portion of the plate has an opening 14 to enable the spring plate to be passed over the spring 12. The hub of the spring plate thrusts against the inner end of the bushing and at this point we prefer to provide a ball bearing 15, see Figure 1.

By adjusting this bushing 9 inwardly the tension of this spring 12 can be increased. It is found, however, that with this shape of cone (having an angle of approximately 30° for its side face), a very slight pressure on the back of the valve is necessary to make it tight and we prefer to have this pressure as light as possible so as to reduce wear on the valve and so as to enable it to be turned readily. In this connection it should be noted that any lateral pressures upon the sides of the valve from the ports *s*, *t*, *h*, and *c* are balanced.

The port *s* corresponds to an outlet nipple S which may be threaded to receive a pipe connection. If desired, this threaded nipple could be made integral with the conical seat, but we prefer to form the valve with an outer wall 16 at this point so that a mixing chamber 17 is formed within the valve casing.

Likewise, the port *t* communicates with a threaded nipple T that may lead to a pipe to the tub or else drain directly into the tub if the valve is placed with this connection back of a wall plate, such as the plate 8. In a similar manner the ports *h* and *c* of the valve seat communicate with threaded nipples H and C that project from the valve body.

The wall of the conical seat 1 is provided with radial webs 18 as may be necessary to separate the mixing chambers in the valve casing from the inlet nipples *c* and *h*.

On the outside of the valve the handle 5 is preferably formed with a pointer 19 that extends upwardly and curves toward the wall plate so as to conform with the nearly spherical form of the pointer, and the top of this pointer cooperates with legends "tub" and "shower" cast in the pointer with arrows indicating the proper direction to rotate the handle to admit water either to the shower or the tub. For example, by rotating the pointer to the right, as indicated in Figure 4, the shower will be supplied first with cold water, as indicated by the legends, and then by a mixture, and finally by hot water alone.

It is understood that the embodiment of the invention described herein is only one of the many embodiments this invention may take, and we do not wish to be limited in the practice of the invention, nor in the claims, to the particular embodiment set forth.

What we claim is:

1. In a combination hot and cold water faucet for serving a shower and a tub, the combination of a rotary valve having a port for serving the shower and the tub, and having a pair of ports either of which may pass hot or cold water and located in the same rotary plane with respect to each other, but in a different rotary plane from the first named port of the valve, a valve casing having a seat to receive the rotary valve and having a pair of oppositely disposed ports corresponding respectively to the shower and the tub and located substantially in the same plane of rotation as the first named port of the valve, said seat also having a pair of oppositely disposed ports corresponding to the hot water and the cold water located substantially in the plane of rotation of the second named ports of the valve, and located on a diametrical line transverse to the line joining the first named ports of the seat, said valve having an "off" position in which the first named port of the valve is located between the first named ports of the valve-seat, and in which the second named ports of the valve are located opposite to each other and intermediate, respectively, between the two second named ports of the seat but nearer to one than the other, whereby, when the valve is rotated in one direction the second named ports of the valve and the second named ports of the valve-seat will register with each other in succession, thereby enabling the valve to deliver, first, water of one extreme temperature and then a mixture of the water of high and low temperature, and thereafter water of the other extreme temperature.

2. In a combination hot and cold water faucet for serving a shower and a tub, the combination of a rotary valve having a mixing chamber with an outlet port for serving the shower and the tub, and having a pair of inlet ports located in the same rotary plane with respect to each other but in a different rotary plane from the said outlet port, a valve casing having a seat to receive the rotary valve and having a pair of oppositely disposed outlet ports corresponding respectively to the shower and the tub and located substantially in the same plane of rotation as the said outlet port of the valve, said seat also having a pair of oppositely disposed inlet ports corresponding respectively to the hot water and the cold water located substantially in the plane of rotation of the said inlet ports of the valve and located on a diametrical line transverse to the line joining the two outlet ports of the seat, said valve having an "off" position in which its outlet port is located substantially midway between the outlet ports of the valve-seat and in which the valve inlet ports are located opposite to each other and intermediate respectively between two inlet ports of the seat, but nearer to one than the other, whereby, when the valve is rotated in one direction the inlet ports will be opened in succession, and for a period as the rotation continues opened simultaneously, and thereafter closed in succession, thereby enabling the valve to deliver, first, water of one extreme temperature and then a mixture of the water of high and low temperature, and thereafter water of the other extreme temperature.

3. In a combination hot and cold water faucet serving a shower and a tub, the combination of a substantially conical rotary valve having a mixing chamber within the same with an outlet port for serving the shower and tub, and having a pair of inlet ports located in the same rotary plane with respect to each other but in a different rotary plane from the said outlet port, a valve casing having a seat to receive the rotary valve and having a tub outlet port and a shower outlet port located substantially in the same plane of rotation as the said outlet port of the valve, said seat also having a hot water inlet port and a cold water inlet port located substantially in the plane of rotation of the inlet ports of the valve and located on a diametrical line substantially at right angles to the line joining the two outlet ports of the seat, said valve having an "off" position in which its outlet port is located substantially midway between the outlet ports of the valve-seat and in which the valve inlet ports are located opposite to each other but on the same side of a diametrical line connecting the said two outlet ports of the seat so that said valve inlet ports are nearer to one of the inlet ports of the valve-seat than the other, whereby, when the valve is rotated the inlet ports of the valve will register in succession with the inlet ports of the seat so as to open the inlet ports of the valve in succession, and for a period as the rotation continues, maintain the same open simultaneously to effect a mixture of hot and cold water, and thereafter close, in succession, thereby enabling the valve to deliver, first, water of one extreme temperature and then a mixture of the water of high and low temperature, and thereafter water of the other extreme temperature.

4. In a combination hot and cold water faucet serving a shower and a tub, the combination of a substantially conical rotary valve having a mixing chamber within the same with an outlet port for serving the shower and tub, and having a pair of inlet ports located in the same rotary plane with respect to each other but in a different rotary plane from the said outlet port, a valve casing having a seat to receive the rotary valve and having a tub outlet port and a shower outlet port located substantially in the same plane of rotation as the said outlet port of the valve, said seat also having a hot water inlet port and a cold water inlet port located substantially in the plane of rotation of the inlet ports of the valve and located on a diametrical line substantially at right angles to the line joining the two outlet ports of the seat, said valve having an "off" position in which its outlet port is located substantially midway between the outlet ports of the valve-seat and in which the valve inlet ports are located opposite to each other but on the same side of a diametrical line connecting the said two outlet ports of the seat so that said valve inlet ports are nearer to one of the inlet ports of the valve-seat than the other, whereby, when the valve is rotated the inlet ports of the valve will register in succession with the inlet ports of the seat so as to open the inlet ports of the valve in succession, and for a period as the rotation continues, maintain the same open simultaneously to effect a mixture of hot and cold water, and thereafter close in succession, thereby enabling the valve to deliver, first, water of one extreme temperature and then a mixture of the water of high and low temperature, and thereafter water of the other extreme temperature, said valve having a co-axial stem for rotating the same, a bushing around the stem, and a spring plate thrusting against the inner end of the bushing and thrusting against the outer end of the valve for pressing the same lightly onto its seat.

5. In a combination hot and cold water faucet serving a shower and a tub, the combination of a substantially conical rotary valve having a mixing chamber within the same with an outlet port for serving the shower and tub, and having a pair of inlet ports located in the same rotary plane with respect to each other but in a different rotary plane from the said outlet port, a valve casing having a seat to receive the rotary valve and having a tub outlet port and a shower outlet port located substantially in the same plane of rotation as the said outlet port of the valve, said seat also having a hot water inlet port and a cold water inlet port located substantially in the plane of rotation of the inlet ports of the valve and located on a diametrical line substantially at right angles to the line joining the two inlet ports of the seat, said valve having an "off" position in which its outlet port is located substantially midway between the outlet ports of the valve-seat and in which the valve inlet ports are located opposite to each other but on the same side of a diametrical line connecting the said two outlet ports of the seat so that said valve inlet ports are nearer to one of the inlet ports of the valve-seat than the other, whereby, when the valve is rotated the inlet ports of the valve will register in succession with the inlet ports of the seat so as to open the inlet ports of the valve in succession, and for a period as the rotation continues, maintain the same open simultaneously to effect a mixture of hot and cold water, and thereafter closed, in succession, thereby enabling the valve to deliver, first, water of one extreme temperature and then a mixture of the water of high and low temperature, and thereafter water of the other extreme temperature, said valve having a co-axial stem for rotating the same and a bushing around the stem, and a spring plate thrusting against the inner end of the bushing and thrusting against the outer end of the valve for pressing the same lightly on to its seat, and a ball bearing imparting the thrust from the spring to the end of the bushing.

6. In a mixing valve for mixing two liquids and supplying either of the liquids unmixed with the other, the combination of a rotary valve having a mixing chamber within the same with an arcuate outlet port located on a given radius from the axis of rotation of the valve, and having a pair of arcuate inlet ports located at the same radius from the axis of rotation with respect to each other but on a different radius from the said outlet port, and a valve casing having a seat to receive the rotary valve and having two outlet ports in line with the outlet port of the valve so that either may register with the same, said seat also having an inlet port for one of the liquids and an inlet port for the other liquid, said last named inlet ports being located on substantially the same radius as the inlet ports of the valve so that either of the inlet ports of the valve may register with either of the inlet ports of the valve seat, said valve having an "off" position in which its outlet port is located substantially midway between the outlet ports of the valve-seat and in which the valve inlet ports are located opposite to each other but on the same side of a diametrical line connecting the said two outlet ports of the seat, and so that said valve inlet ports are nearer to one of the inlet ports of the valve-seat than the other, whereby, when the valve is rotated its inlet ports will register in succession with corresponding inlet ports of the seat so as to open one of the inlet ports of the valve before the other, and operating for a period as the rotation continues, to maintain both the inlet ports open simultaneously to effect a mixture of the liquids, thereby enabling the valve to deliver first one of the liquids and then a mixture of the liquids, and thereafter, the other liquid unmixed.

Signed at Los Angeles, California, this 26th day of November, 1929.

EARLE H. CARDER.
AUGUSTUS W. CARDER.